(12) United States Patent
Kim et al.

(10) Patent No.: US 10,297,798 B2
(45) Date of Patent: May 21, 2019

(54) RECHARGEABLE BATTERY

(71) Applicant: Samsung SDI Co., Ltd., Yongin-si, Gyeonggi-do (KR)

(72) Inventors: Bo-Hyun Kim, Yongin-si (KR); Yu-Jin Han, Yongin-si (KR); Hye-Jin Kwon, Yongin-si (KR); Jong-Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 221 days.

(21) Appl. No.: 15/295,815

(22) Filed: Oct. 17, 2016

(65) Prior Publication Data

US 2017/0117508 A1    Apr. 27, 2017

(30) Foreign Application Priority Data

Oct. 23, 2015    (KR) .................... 10-2015-0148214

(51) Int. Cl.
*H01M 2/02*    (2006.01)
*H01M 2/06*    (2006.01)
*H01M 10/04*    (2006.01)

(52) U.S. Cl.
CPC ......... *H01M 2/021* (2013.01); *H01M 2/0212* (2013.01); *H01M 2/0267* (2013.01); *H01M 2/06* (2013.01); *H01M 10/0413* (2013.01); *H01M 10/0436* (2013.01); *H01M 2220/20* (2013.01); *H01M 2220/30* (2013.01)

(58) Field of Classification Search
CPC ......... H01M 10/0413; H01M 10/0436; H01M 2220/20; H01M 2220/30; H01M 2/021; H01M 2/06
See application file for complete search history.

(56) References Cited

U.S. PATENT DOCUMENTS

| 6,451,476 | B1 * | 9/2002 | Chang | ................. | H01M 2/0212 |
|---|---|---|---|---|---|
| | | | | | 429/127 |
| 2006/0051658 | A1 * | 3/2006 | Otohata | ................ | H01M 2/021 |
| | | | | | 429/53 |
| 2006/0093905 | A1 * | 5/2006 | Kim | ...................... | H01M 2/021 |
| | | | | | 429/175 |

(Continued)

FOREIGN PATENT DOCUMENTS

| KR | 10-2011-0107448 A | 10/2011 |
|---|---|---|
| KR | 10-2012-0102935 A | 9/2012 |
| KR | 10-2014-0026158 A | 3/2014 |

*Primary Examiner* — Carlos Barcena
(74) *Attorney, Agent, or Firm* — Lewis Roca Rothgerber Christie LLP

(57) ABSTRACT

A rechargeable battery includes an electrode assembly, a pouch accommodating the electrode assembly, and including first and second exterior members facing each other with the electrode assembly therebetween, and a sealing portion having a sealing width and sealing the first exterior member and the second exterior member along an outer edge of the electrode assembly, and lead tabs electrically connected to the electrode assembly and drawn to the outside of the pouch, wherein the sealing portions define grooves, each of the grooves having a size that is less than the sealing width, and wherein the sealing portion is bent along the outer edge of the electrode assembly and attached to a side surface of the pouch.

14 Claims, 10 Drawing Sheets

(56) References Cited

U.S. PATENT DOCUMENTS

| | | | | |
|---|---|---|---|---|
| 2007/0196733 A1* | 8/2007 | Lee | ............... | H01M 2/08 |
| | | | | 429/185 |
| 2008/0057384 A1* | 3/2008 | Jang | ............... | H01M 2/021 |
| | | | | 429/129 |
| 2011/0123844 A1* | 5/2011 | Bhardwaj | ............... | H01M 2/021 |
| | | | | 429/56 |
| 2011/0129728 A1* | 6/2011 | Kim | ............... | H01M 2/0267 |
| | | | | 429/185 |
| 2011/0244315 A1* | 10/2011 | Yoon | ............... | H01M 2/0207 |
| | | | | 429/176 |
| 2012/0015236 A1* | 1/2012 | Spare | ............... | H01M 2/0275 |
| | | | | 429/162 |
| 2013/0122335 A1* | 5/2013 | Park | ............... | H01M 2/0212 |
| | | | | 429/82 |
| 2014/0349167 A1* | 11/2014 | Wakai | ............... | H01M 2/1686 |
| | | | | 429/139 |

* cited by examiner

RECHARGEABLE BATTERY

CROSS-REFERENCE TO RELATED APPLICATION

This application claims priority to, and the benefit of, Korean Patent Application No. 10-2015-0148214, filed in the Korean Intellectual Property Office on Oct. 23, 2015, the entire contents of which are incorporated herein by reference.

BACKGROUND

1. Field

Embodiments of the present invention relate to a rechargeable battery.

2. Description of the Related Art

Demand for a rechargeable battery as an energy source has increased as demand for technical development of a mobile device has increased. A rechargeable battery differs from a primary battery in that the former is configured to be repeatedly charged and discharged, while the latter is configured to irreversibly convert chemical energy to electrical energy.

A small rechargeable battery is often used as a power supply for small electronic devices, such as cellular phones, notebook computers, and camcorders, while a medium or large rechargeable battery is often used as a power supply for driving motors in hybrid vehicles and electric vehicles.

For example, a pouch-type rechargeable battery includes an electrode assembly that performs charging and discharging, a pouch that accommodates the electrode assembly and an electrolyte solution, and a lead tab that draws the electrode assembly to the outside of the pouch.

Electronic devices require variously sized and shaped rechargeable batteries, depending on the type, size, and shape of an inner space of the electronic device. However, a rechargeable battery having a cylindrical shape or a rectangular parallelepiped shape cannot be effectively accommodated in an accommodating space of some electronic devices.

As such, a pouch-type rechargeable battery may have an irregular shape having a curved portion, rather than having a regular shape, such as a rectangular parallelepiped, or may have a curved and flexible structure while having a rectangular parallelepiped shape to be effectively accommodated in the inner space of the electronic device.

In a rechargeable battery, a sealing portion is provided at an outer edge of a pouch accommodating the electrode assembly, and the sealing portion is folded and then attached to a side surface of the pouch. However, when the pouch has an irregular shape having a curved portion formed at an outer edge thereof, a sealing portion provided in the outer edge of the pouch may form wrinkles in an external circumference (or periphery) due to a difference in diameter between the sealing portion and the pouch.

Further, wrinkles of the sealing portion may be different from each other depending on the shape (or irregularity) of the rechargeable battery. As such, spaces formed between the side surface of the pouch, where the electrode assembly is installed, and the sealing portion may have different sizes.

The wrinkles of the sealing portion, and the spaces formed between the side surface of the pouch and the sealing portion, may cause an increase of the entire volume, and may decrease energy density of the rechargeable battery.

The above information disclosed in this Background section is only for enhancement of understanding of the background of embodiments of the invention, and therefore it may contain information that does not form the prior art.

SUMMARY OF THE INVENTION

Embodiments of the present invention provide a rechargeable battery that can eliminate spaces between a side surface of a pouch and a folded sealing portion at an outer edge of the pouch without generating wrinkles in the sealing portion when the sealing portion is folded to the side surface of the pouch.

Embodiments of the present invention provide a rechargeable battery that can tightly (e.g., air-tightly) attach a folded sealing portion provided in an outer edge of a pouch having a curved portion to the side surface of the pouch.

A rechargeable battery according to one or more exemplary embodiments of the present invention includes an electrode assembly, a pouch accommodating the electrode assembly, and including first and second exterior members facing each other with the electrode assembly therebetween, and a sealing portion having a sealing width, and sealing the first exterior member and the second exterior member along an outer edge of the electrode assembly, and lead tabs electrically connected to the electrode assembly and drawn outside of the pouch, wherein the sealing portion defines grooves, each of the grooves having a size that is less than the sealing width, and wherein the sealing portion is bent along the outer edge of the electrode assembly, and attached to a side surface of the pouch.

The sealing portion may include a terrace portion through which the lead tab is drawn outside of the pouch, and a curved portion connected to the terrace portion, and attached to the side surface of the pouch.

The curved portion may be formed as a circular arc in a plane, and the grooves may be aligned with a radial direction of the curved portion.

The grooves may extend from an inner point of the sealing portion at an angle, and may define a first width at an outer surface of the curved portion.

The first width may be reduced when the sealing portion is folded and attached to the side surface of the pouch, and a shape of the side surface of the pouch may correspond to a shape of the side surface of the electrode assembly.

The grooves may extend in the radial direction at an angle from an inner point of the curved portion, and extend toward an outer end of the curved portion.

A first side of a first part of the sealing portion defining a first part of a respective one of the grooves may overlap with a second side of a second part of the sealing portion defining a second part of the respective one of the grooves when the curved portion is folded and attached to the side surface of the electrode assembly.

The sealing portion may be folded along a circumferential surface of the curved portion, and may be attached to the side surface of the pouch.

The sealing portion may include a terrace portion through which the lead tab is drawn outside of the pouch, and a side portion connected to the terrace portion and having a planar shape.

The grooves may be defined in a direction crossing the side portion.

The grooves may extend at an angle from an inner point of the sealing portion and may have a second width in an outer surface of the sealing portion.

As described, according to one or more exemplary embodiments of the present invention, cut-out grooves are provided in a sealing portion, and the sealing portion is folded along the outer edge of the electrode assembly, and then the folded sealing portion is attached to the side surface of the pouch so that no (or few) wrinkles are generated in the sealing portion, and accordingly no (or few) spaces are formed between the side surface of the pouch and the folded sealing portion. Accordingly, the sealing portion and the side surface of the pouch can be air-tightly (or substantially air-tightly) attached.

DETAILED DESCRIPTION OF THE EMBODIMENTS

Figure 1:
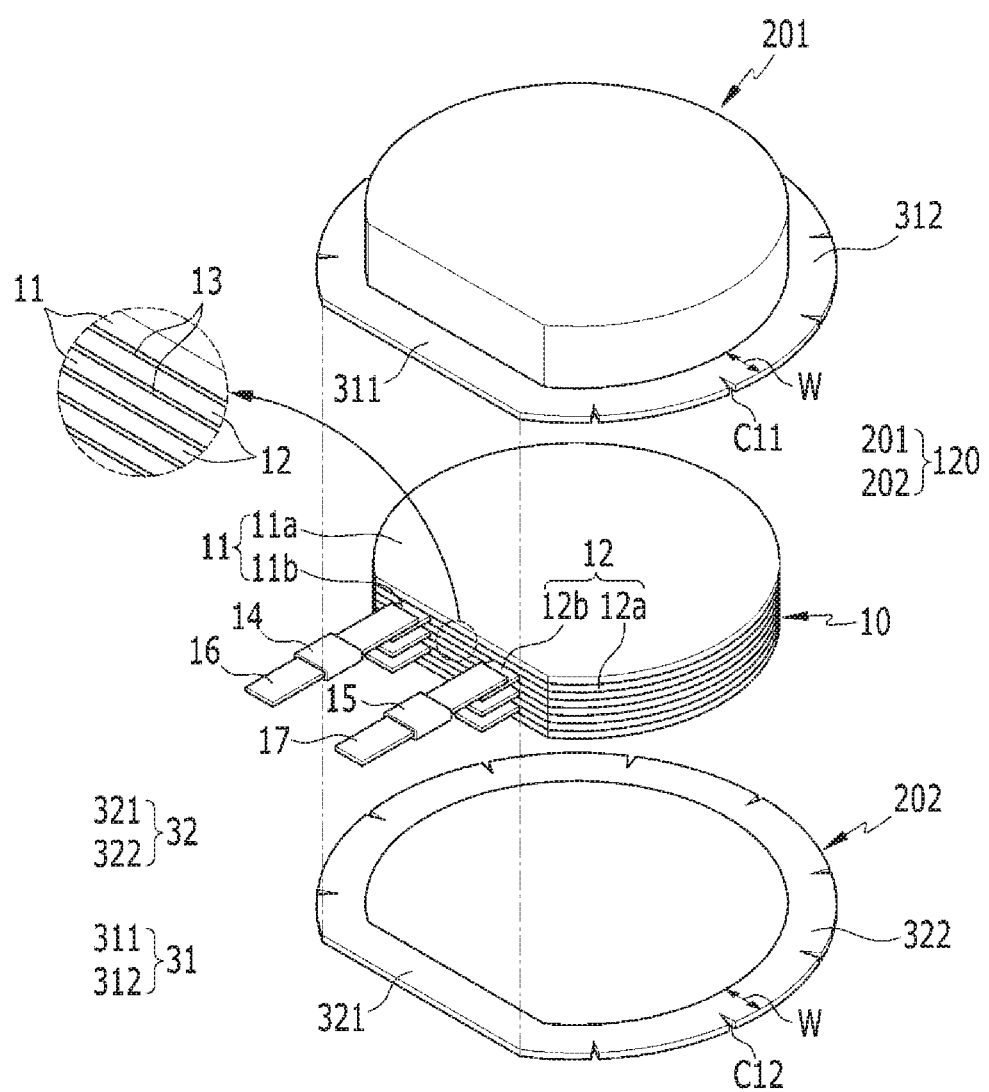
FIG. 1 is an exploded perspective view of a rechargeable battery according to one or more exemplary embodiments of the present invention.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on" or "connected to" another element or layer, it can be directly on or connected to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
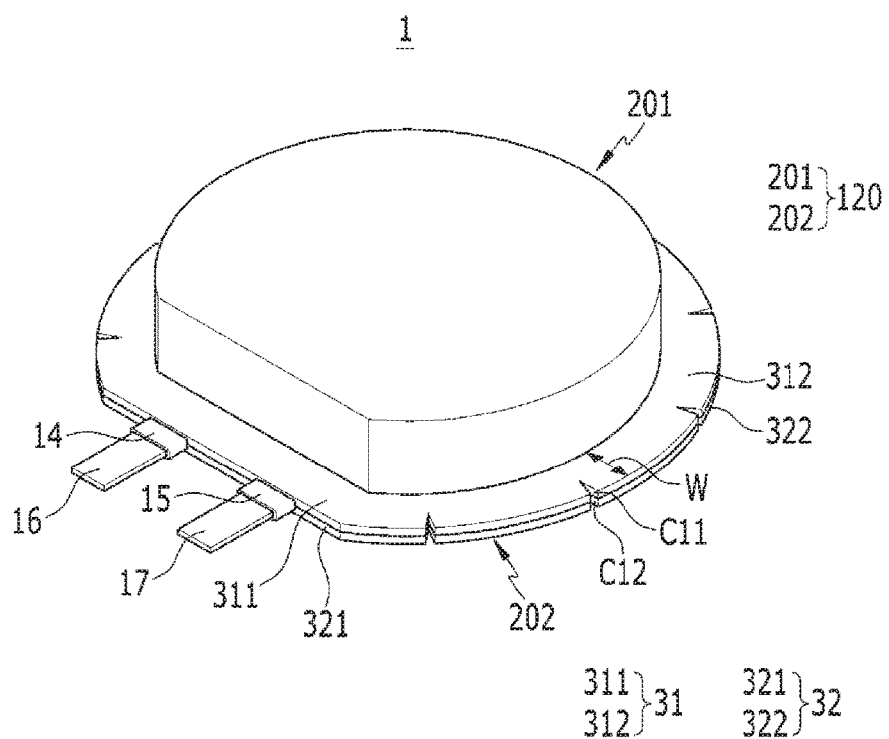
FIG. 2 is a perspective view of the rechargeable battery of FIG. 1 in an assembled state.

FIG. 1 is an exploded perspective view of a rechargeable battery according to one or more exemplary embodiments of the present invention, and FIG. 2 is a perspective view of the rechargeable battery of FIG. 1 in an assembled state. Throughout the specification, the term "irregularity" means that a curved portion is formed in at least a part of an outer edge of an electrode assembly or pouch.

Referring to FIG. 1 and FIG. 2, a rechargeable battery 1 according to one or more exemplary embodiments of the present invention includes an electrode assembly 10 for charging and discharging a current, a pouch 120 accommodating the electrode assembly 10 and having flexibility, and lead tabs 16 and 17 electrically connected to the electrode assembly 10 and drawn outside of the pouch 120.

The electrode assembly 10 is formed by disposing a negative electrode 11 and a positive electrode 12 at lateral sides (or opposite sides) of a separator 13, which is an insulator, and by layering the negative electrode 11, the separator 13, and the positive electrode 12. The negative electrode 11 and the positive electrode 12 respectively include coated regions 11a and 12a on which an active material is coated on a metal thin film current collector, and respectively include uncoated regions 11b and 12b on which a current collector is not coated with the active material, and thus are exposed.

For example, the negative electrode 11, the positive electrode 12, and the separator 13 may have a partially (or substantially) circular shape of which a part is cut by a straight line. For example, the negative electrode 11 and the positive electrode 12 may each have an irregular shape with a flat (or straight line) portion and a curved (or curved line) portion that connects lateral ends of the straight line with a curved line. The curved-line portions of the negative and positive electrodes 11 and 12 form a curved portion at a side surface of the electrode assembly 10 when the negative electrode 11 and the positive electrode 12 are layered, and the pouch 120 may have a curved portion at a side surface thereof corresponding to the curved portions of the negative and positive electrodes 11 and 12.

The uncoated regions 11b of the negative electrode 11 protrude from the layered straight line portions of the negative electrode 11. The uncoated regions 12b of the positive electrode 12 protrude from the layered straight line portions of the positive electrode 12. Further, the straight line portions of the negative and positive electrodes 11 and 12 form a planar portion in a side surface of the electrode assembly 10. The respective uncoated regions 11b and 12b of the negative and positive electrodes 11 and 12 are alternately disposed at lateral sides of the planar portion of the electrode assembly 10.

The pouch 120 includes a first exterior member 201 and a second exterior member 202 that face each other with the electrode assembly 10 therebetween, and sealing portions 31 and 32 that seal the first and second exterior members 201 and 202, and that each have a sealing width (e.g., a predetermined sealing width) W along an outer edge of the electrode assembly 10. The lead tabs 16 and 17 are respectively connected to the uncoated regions 11b and 12b of the negative and positive electrodes 11 and 12, and are drawn to the outside through the sealing portions 31 and 32, with insulation members 14 and 15 respectively interposed therebetween.

Outer edges of the first exterior member 201 and the second exterior member 202 may be thermally welded with the electrode assembly 10 installed (or accommodated) therebetween to form the sealing portions 31 and 32. The lead tabs 16 and 17 are drawn to the outside through the sealing portions 31 and 32 while being electrically insulated from each other.

For example, the pouch 120 may include an inner sheet, an outer sheet, and a metal sheet. The first and second exterior members 201 and 202 may each be formed of an inner sheet, an outer sheet, and a metal sheet having the same or substantially the same layered structure.

The inner sheet forms an inner surface of the pouch 120, performs insulation and thermo-bonding functions, and may be formed of a polymer sheet. The outer sheet forms an outer surface of the pouch 120, protects the pouch 120, and may be formed of a polyethylene terephthalate (PET) sheet, a nylon sheet, or a PET-nylon combination sheet.

The metal sheet may be provided between the inner sheet and the outer sheet to provide mechanical strength, and may be formed of an aluminum sheet.

As one example, the first exterior member 201 may have a concave shape to accommodate the electrode assembly 10, and the second exterior member 202 may have a flat (or substantially flat) shape to cover the electrode assembly 10 accommodated in the first exterior member 201.

The sealing portions 31 and 32 respectively include terrace portions 311 and 321 that have straight edge portions (e.g., edge portions formed in straight lines), which correspond to the straight line portions of the negative and positive electrodes 11 and 12 through which the lead tabs 16 and 17 are drawn to the outside, and that have curved portions 312 and 322, which are connected to the terrace portions 311 and 321 and are curved.

The curved portions 312 and 322 are formed along the curved line portions of the negative and positive electrodes 11 and 12, and are bent and attached to the side surface of the pouch 120. Because the side surface of the pouch 120 is curved, the curved portions 312 and 322 of the sealing portions 31 and 32 may be closely attached to the side surface of the pouch 120.

Figure 3:
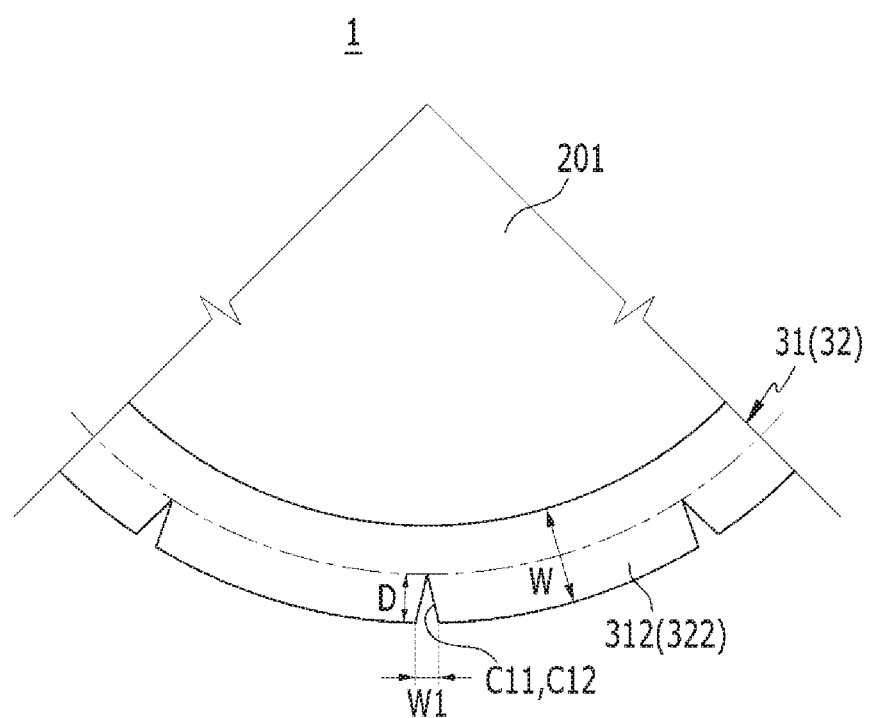
FIG. 3 is a partial top plan view of the rechargeable battery of FIG. 2.

FIG. 3 is a partial top plan view of the rechargeable battery 1 of FIG. 2. Referring to FIGS. 1-3, the sealing portions 31 and 32 are respectively provided with grooves (e.g., cut-out grooves) C11 and C12, which have a size (e.g., a depth) that is less than the sealing width W of the sealing portions 31 and 32. The cut-out grooves C11 and C12 are respectively provided in the curved portions 312 and 322 of the sealing portions 31 and 32.

As an example, the curved portions 312 and 322 are formed as circular arcs in a plane that correspond to the curved line portions of the negative and positive electrodes 11 and 12. The cut-out grooves C11 and C12 are formed to be aligned with a radial direction of the curved portions 312 and 322. The cut-out grooves C11 and C12 are formed at an angle (e.g., a predetermined angle) from inner points of the curved portions 312 and 322 (e.g., from the radial center line of the curved portions 312 and 322), and have first widths (e.g., first cut-out widths) W1 at outer sides of the curved portions 312 and 322.

Figure 4:
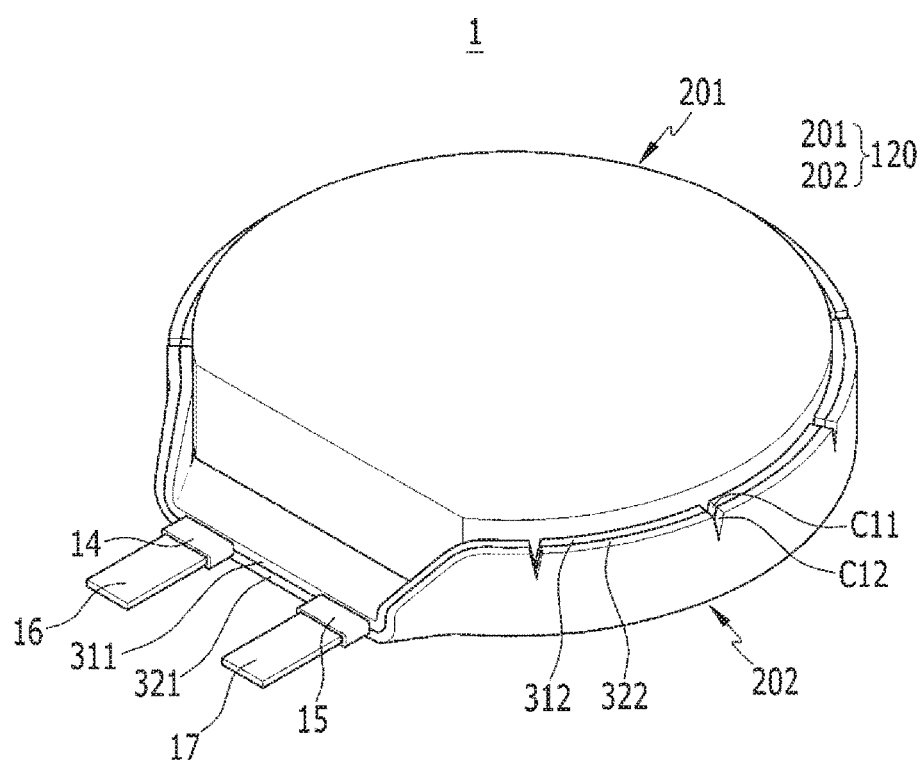
FIG. 4 is a perspective view of the rechargeable battery of FIG. 2 with a sealing portion thereof folded and attached to a side surface of a pouch.
Figure 5:
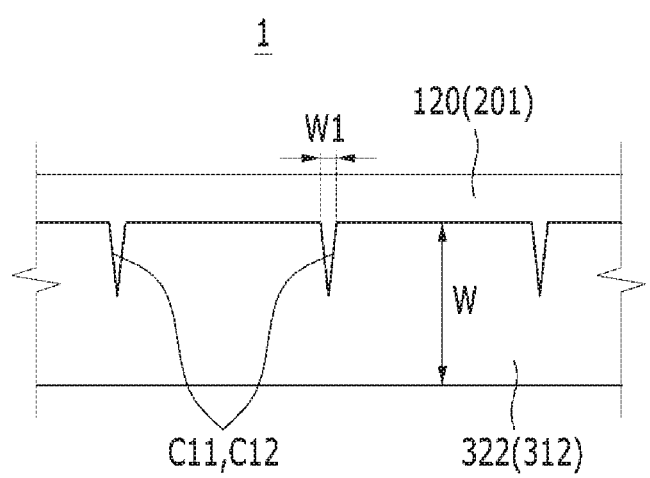
FIG. 5 is a partial side view of the rechargeable battery of FIG. 4.

FIG. 4 is a perspective view of the rechargeable battery 1 of FIG. 2, in which the sealing portions 31 and 32 are folded and then attached to the side surface (e.g., circumferential surface) of the pouch 120, and FIG. 5 is a partial side view of the rechargeable battery 1 of FIG. 4. Referring to FIGS. 4 and 5, the curved portions 312 and 322 of the sealing portions 31 and 32 are bent along the outer edge of the electrode assembly 10, and then attached along the side surface of the pouch 120.

When the sealing portions 31 and 32 are folded, the first cut-out widths W1 of the cut-out grooves C11 and C12 are effectively removed (or are reduced). The first cut-out widths W1 are gradually narrowed, as illustrated in FIG. 5. As the first cut-out width W1 is effectively removed (or reduced in size), the curved portions 312 and 322 are attached to the side surface of the pouch 120, which has a curved surface, without generating wrinkles. That is, the first cut-out widths W1 absorb a length difference of the curved portions 312 and 322 in the curved direction (e.g., allow for displacement of the curved portions 312 and 322 during the folding).

A depth D of the cut-out grooves C11 and C12 in a direction of the sealing width W of the sealing portions 31 and 32 may be formed within a range such that sealing performance of the sealing portions 31 and 32 does not deteriorate. When the curved portions 312 and 322 are attached to the side surface of the pouch 120, the cut-out grooves C11 and C12 can effectively absorb a length difference in a direction of the curved surface in the curved portions 312 and 322 according to the depth D of the cut-out grooves C11 and C12.

Thus, little or no space is formed between the curved portions 312 and 322 of the sealing portions 31 and 32 and the side surface of the pouch 120. For example, the curved portions 312 and 322 of the sealing portions 31 and 32 can be tightly attached (e.g., air-tightly attached) to the side surface of the pouch 120. Because the sealing portions 31 and 32 and the curved portions 312 and 322 do not increase the entire volume of the rechargeable battery 1, energy density can be increased (e.g., energy density in a predetermined volume can be increased).

Hereinafter, various exemplary embodiments of the present invention are described. For convenience, repeated description of the same or substantially the same configurations as those of the exemplary embodiment described above may be omitted, and different configurations from those of the exemplary embodiment described above may be primarily described.

Figure 6:
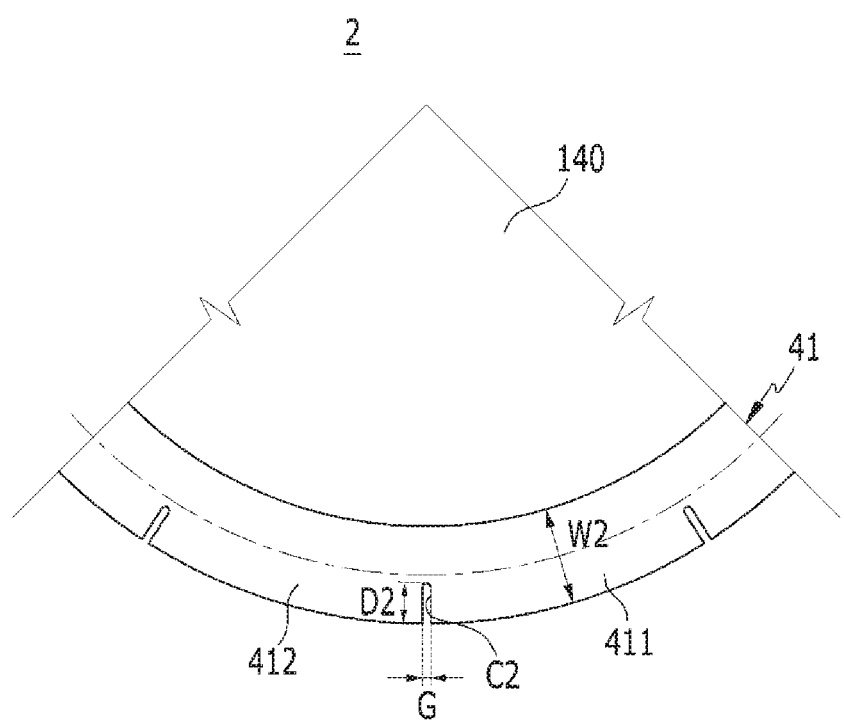
FIG. 6 is a partial top plan view of a rechargeable battery according to one or more exemplary embodiments of the present invention.
Figure 7:
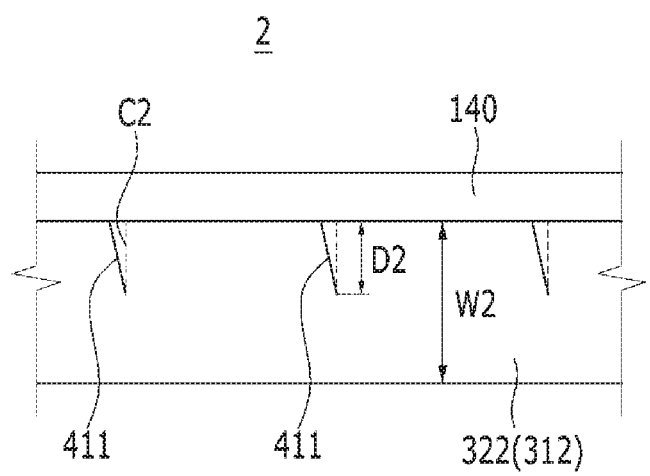
FIG. 7 is a partial side view of the rechargeable battery of FIG. 6 with a sealing portion thereof folded and attached to a side surface of a pouch.
Figure 8:
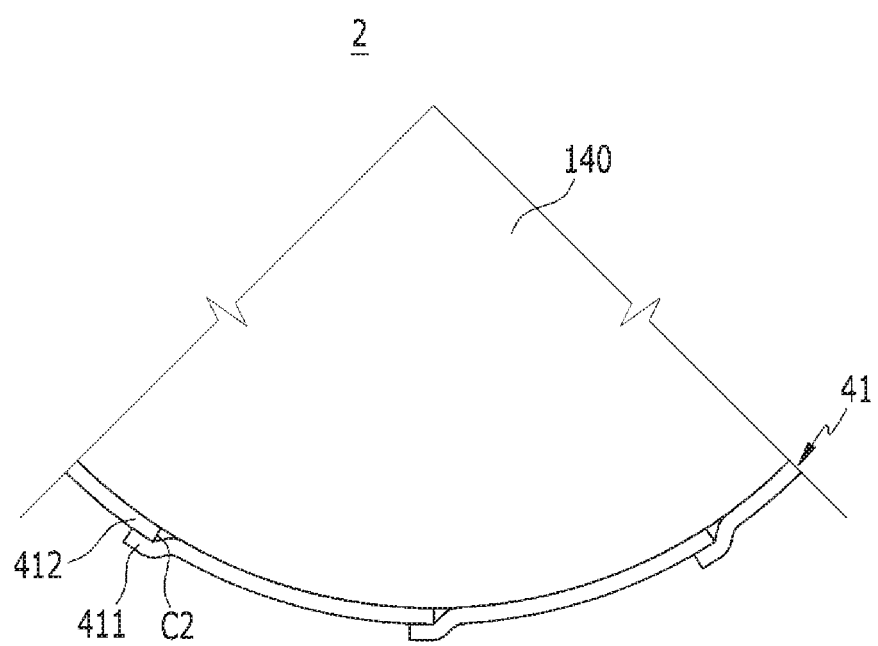
FIG. 8 is a partial top plan view of the rechargeable battery of FIG. 7.

FIG. 6 is a partial top plan view of a rechargeable battery according to one or more exemplary embodiments of the present invention, FIG. 7 is a side view of the rechargeable battery of FIG. 6, in which a sealing portion is folded and then attached to a side surface of a pouch, and FIG. 8 is a top plan view of the rechargeable battery of FIG. 7.

Referring to FIGS. 6, 7, and 8, a pouch 140 of a rechargeable battery 2 according to the present exemplary embodiment of the present invention includes a groove (e.g., a cut-out groove) C2 that extends in a diameter direction (e.g., radial direction) of a curved portion 41 and has a gap G (e.g., a predetermined gap), and thus reaches an outer end from one inner point in the diameter direction.

When the curved portion 41 is folded and then attached to a side curved surface of the pouch 140 corresponding to a side surface of an electrode assembly 10, a first end 411 of the cut-out groove C2 overlaps with a second end 412 of the cut-out groove C2.

Because the first end 411 and the second end 412 overlap, the curved portion 41 does not form wrinkles at the side curved surface of the pouch 140. For example, the cut-out groove C2 induces, or enables, overlapping of the first and second ends 411 and 412 to thereby absorb a length difference in the curved-surface direction of the curved portion 41.

A depth D2 of the cut-out groove C2 in a direction of a sealing width W2 of the curved portion 41 may have a depth (e.g., a maximum depth) within a suitable range such that sealing performance of the curved portion 41 does not deteriorate. When the curved portion 41 is attached to the side surface of the pouch 140, the cut-out groove C2 can effectively absorb the length difference in the curved surface direction of the curved portion 41 according to the depth D2 of the cut-out groove C2.

Figure 9:
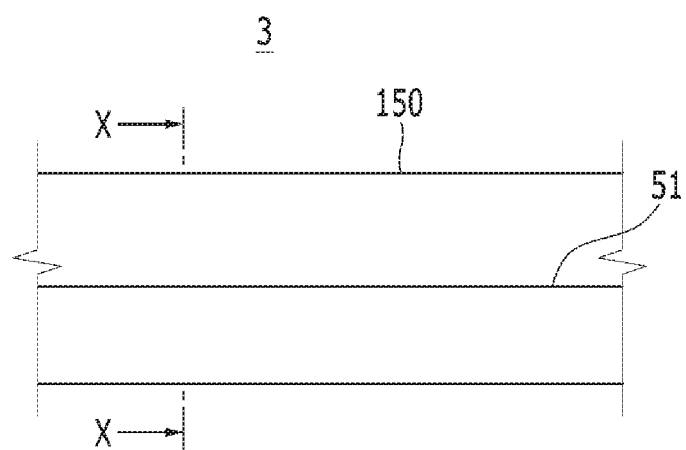
FIG. 9 is a partial side view of a rechargeable battery according to one or more exemplary embodiments of the present invention.
Figure 10:
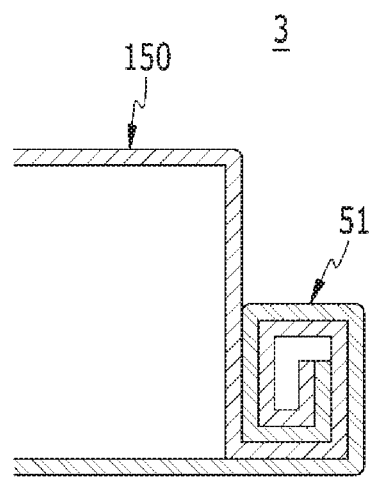
FIG. 10 is a cross-sectional view of the rechargeable battery of FIG. 9, taken along the line X-X of FIG. 9.

FIG. 9 is a partial side view of a rechargeable battery according to one or more exemplary embodiments of the present invention, and FIG. 10 is a cross-sectional view of the rechargeable battery of FIG. 9, taken along the line X-X of FIG. 9. Referring to FIGS. 9 and 10, in a rechargeable battery 3 according to one or more exemplary embodiments of the present invention, a curved portion 51 is spirally wound in a diameter direction, or radial direction, of the curved portion 51 of a pouch 150, and then attached to a side surface of the pouch 150.

The curved portion 51 includes cut-out grooves C11 and C22 (refer to FIG. 3), and is spirally wound in the diameter direction, and therefore sealing performance can be further improved as compared to the curved portions 312, 322, and 41 of the first and second exemplary embodiments of the present invention.

Figure 11:
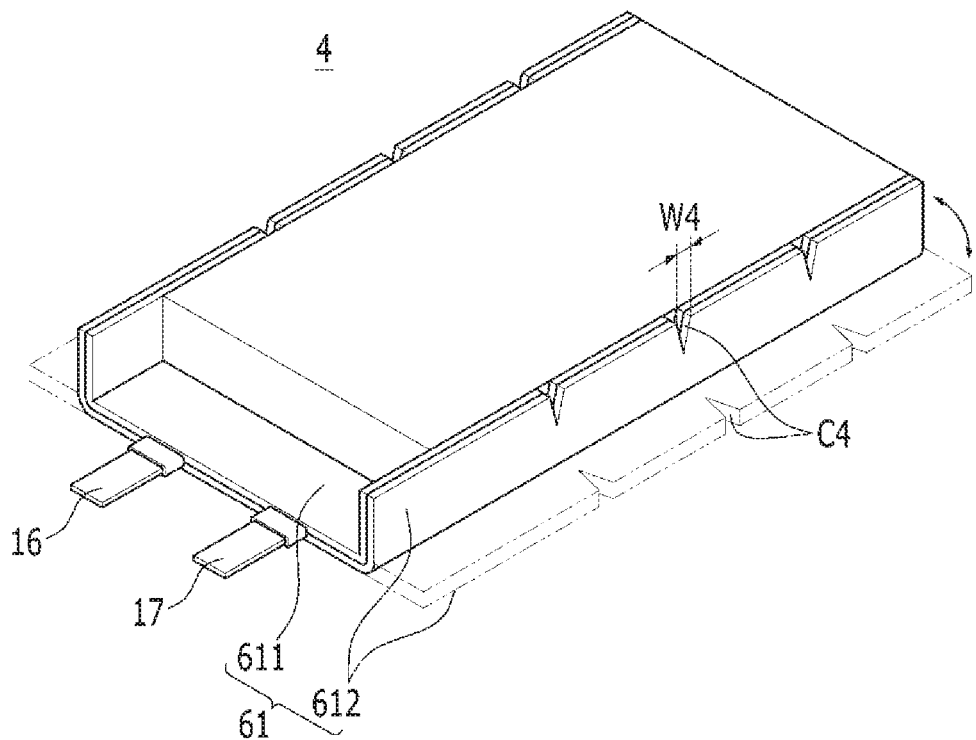
FIG. 11 is a perspective view of a rechargeable battery according to one or more exemplary embodiments of the present invention.
Figure 12:
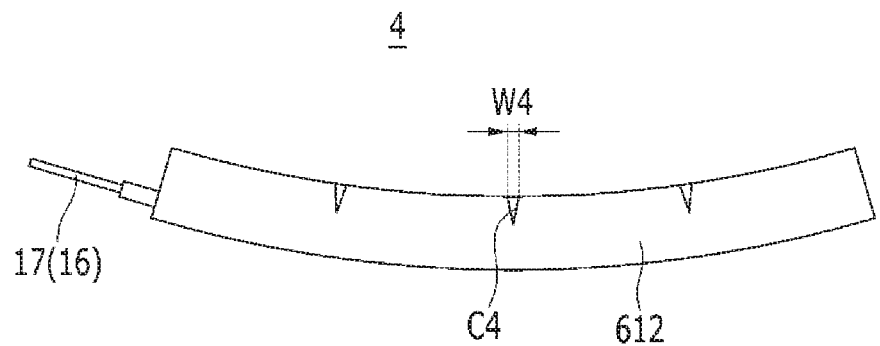
FIG. 12 is a side view of the rechargeable battery of FIG. 11 in a curved state.

FIG. 11 is a perspective view of a rechargeable battery according to one or more exemplary embodiments of the present invention, and FIG. 12 is a side view of the rechargeable battery of FIG. 11 in a bent (or curved) state. Referring to FIGS. 11 and 12, a sealing portion 61 of a rechargeable battery 4 according to one or more exemplary embodiments of the present invention includes a terrace portion 611 through which lead tabs 16 and 17 are drawn to the outside, and includes a side portion 612 connected to the terrace 611 and formed in a plane (e.g., having a planar or substantially planar shape).

A cut-out groove C4 is formed to cross a direction of the side portion 612. That is, the cut-out groove C4 extends to an outer surface of the sealing portion 61 at an angle (e.g., a predetermined angle) from one inner point, and then has a second cut-out width W4 at the outer surface of the sealing portion 61.

As shown in FIG. 12, when the rechargeable battery 4 is bent, the second cut-out width W4 of the side portion 612 is reduced, and thus the side portion 612 and the rechargeable battery 4 can be bent or curved. Accordingly, the side portion 612 of the sealing portion 61 provided at a side surface of the rechargeable battery 4 can be easily bent because the cut-out groove C4 is included in the sealing portion 61.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of some of the symbols | |
|---|---|
| 1, 2, 3, 4: rechargeable battery | 10: electrode assembly |
| 11: negative electrode | 11a, 12a: coated region |
| 11b, 12b: uncoated region | 12: positive electrode |
| 13: separator | 14, 15: insulation member |
| 16, 17: lead tab | 31, 32, 61: sealing portion |
| 41, 51, 312, 322: curved portion | 120, 140: pouch |
| 201: first exterior member | 202: second exterior member |
| 311, 321, 611: terrace portion | 411, 412: first end, second end |
| 612: side portion | |
| C11, C12, C2, C4: cut-out groove | D, D2: depth |
| G: gap | W, W2: sealing width |
| W1: first cut-out width | W4: second cut-out width |

What is claimed is:

1. A rechargeable battery comprising:
an electrode assembly;
a pouch accommodating the electrode assembly, and comprising:
first and second exterior members facing each other with the electrode assembly therebetween, and
a sealing portion having a sealing width, and sealing the first exterior member and the second exterior member along an outer edge of the electrode assembly, the sealing portion defining a first portion adjacent the outer edge of the electrode assembly and a second portion spaced apart from the outer edge of the electrode assembly; and
lead tabs electrically connected to the electrode assembly and drawn outside of the pouch,
wherein the second portion of the sealing portion defines grooves, each of the grooves having a depth that is less than or equal to half of the sealing width, the grooves extending toward the first portion of the sealing portion, and wherein the sealing portion is bent at the first portion thereof along the outer edge of the electrode assembly, and attached to a side surface of the pouch.

2. The rechargeable battery of claim 1, wherein the sealing portion comprises:
   a terrace portion through which the lead tabs are drawn outside of the pouch; and
   a curved portion connected to the terrace portion, and attached to the side surface of the pouch.

3. The rechargeable battery of claim 2, wherein the curved portion is formed as a circular arc in a plane, and
   wherein the grooves are aligned with a radial direction of the curved portion.

4. The rechargeable battery of claim 3, wherein the grooves extend from an inner point of the sealing portion at an angle, and define a first width at an outer surface of the curved portion.

5. The rechargeable battery of claim 4, wherein the first width is reduced when the sealing portion is folded and attached to the side surface of the pouch, and
   wherein a shape of the side surface of the pouch corresponds to a shape of the side surface of the electrode assembly.

6. The rechargeable battery of claim 3, wherein the grooves extend in the radial direction at an angle from an inner point of the curved portion, and extend toward an outer end of the curved portion.

7. The rechargeable battery of claim 6, wherein a first side of a first part of the sealing portion defining a first part of a respective one of the grooves overlaps with a second side of a second part of the sealing portion defining a second part of the respective one of the grooves when the curved portion is folded and attached to the side surface of the electrode assembly.

8. The rechargeable battery of claim 2, wherein the sealing portion is folded along a circumferential surface of the curved portion, and is attached to the side surface of the pouch.

9. The rechargeable battery of claim 2, wherein the grooves are effectively reduced in size when the sealing portion is bent at the first portion thereof along the outer edge of the electrode assembly.

10. The rechargeable battery of claim 1, wherein the sealing portion comprises:
    a terrace portion through which the lead tabs are drawn outside of the pouch; and
    a side portion connected to the terrace portion and having a planar shape.

11. The rechargeable battery of claim 1, wherein the grooves extend at an angle from an inner point of the sealing portion and has a second cut-out width in an outer surface of the sealing portion.

12. A rechargeable battery comprising:
    an electrode assembly;
    a pouch accommodating the electrode assembly, and comprising:
        first and second exterior members facing each other with the electrode assembly therebetween, and
        a sealing portion having a sealing width, and sealing the first exterior member and the second exterior member along an outer edge of the electrode assembly, the sealing portion defining a first portion adjacent the outer edge of the electrode assembly and a second portion spaced apart from the outer edge of the electrode assembly; and
    lead tabs electrically connected to the electrode assembly and drawn outside of the pouch,
    wherein the second portion of the sealing portion defines grooves, each of the grooves having a depth that is less than the sealing width, the grooves extending toward the first portion of the sealing portion,
    wherein the sealing portion is bent at the first portion thereof along the outer edge of the electrode assembly, and attached to a side surface of the pouch, and
    wherein the sealing portion comprises:
        a terrace portion through which the lead tabs are drawn outside of the pouch; and
        a curved portion connected to the terrace portion, and attached to the side surface of the pouch,
    wherein the grooves define a first width at an outer surface of the curved portion, and wherein the first width is less than the sealing width.

13. The rechargeable battery of claim 12, wherein the first width is less than the depth of the grooves.

14. A rechargeable battery comprising:
    an electrode assembly;
    a pouch accommodating the electrode assembly, and comprising:
        first and second exterior members facing each other with the electrode assembly therebetween, and
        a sealing portion having a sealing width, and sealing the first exterior member and the second exterior member along an outer edge of the electrode assembly, the sealing portion defining a first portion adjacent the outer edge of the electrode assembly and a second portion spaced apart from the outer edge of the electrode assembly; and
    lead tabs electrically connected to the electrode assembly and drawn outside of the pouch,
    wherein the second portion of the sealing portion defines grooves, each of the grooves having a depth that is less than the sealing width, the grooves extending toward the first portion of the sealing portion,
    wherein the sealing portion is bent at the first portion thereof along the outer edge of the electrode assembly, and attached to a side surface of the pouch,
    wherein the rechargeable battery is in a curved state, and
    wherein the grooves are effectively reduced in size when the sealing portion is bent at the first portion thereof along the outer edge of the electrode assembly.

* * * * *